Jan. 7, 1969 J. S. GROUT 3,421,117
VARIABLE SCRATCH FILTER CIRCUIT
Filed May 24, 1965
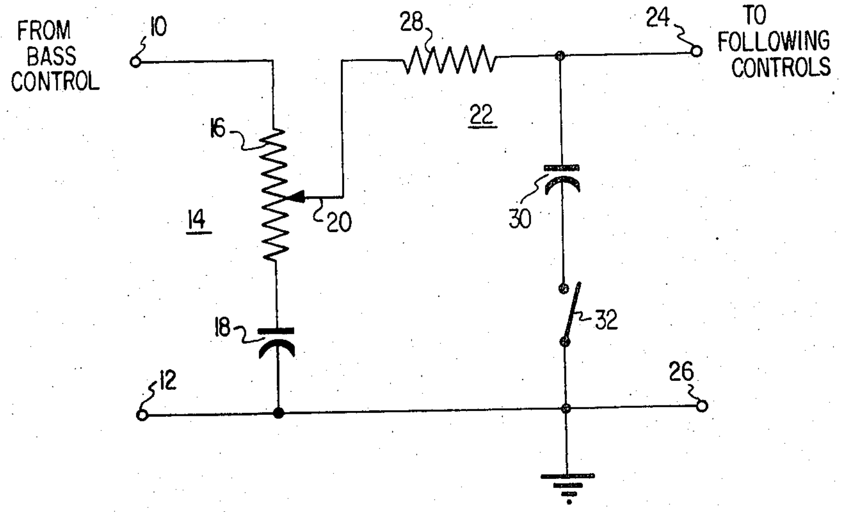
INVENTOR
J. S. GROUT
BY Thomas A. Briody
ATTORNEY 3,421,117
Patented Jan. 7, 1969

3,421,117

VARIABLE SCRATCH FILTER CIRCUIT

John Stephen Grout, Decatur, Ill., assignor to General Electric Company, a corporation of New York Filed May 24, 1965, Ser. No. 458,099
U.S. Cl. 333—28 5 Claims
Int. Cl. H03h 5/00; H03h 1/00

ABSTRACT OF THE DISCLOSURE

For a sound reproducing system having a treble control, a variable scratch filter circuit is provided. This variable scratch filter circuit comprises a resistor connected at one end to a potentiometer wiper arm of the treble control, and a capacitor connected between the other end of the resistor and ground. As the treble control potentiometer is operated to balance the loudness of the reproduced sound, the resistance of the RC scratch filter circuit is increased, thereby lowering the frequency of the so-called roll-off corner of the scratch filter.

This invention generally relates to a scratch filter circuit for a sound reproduction system and more particularly to a variable scratch filter uniquely combined with a treble control.

Scratch filters generally are known for eliminating from sound reproduction systems the noise caused by scratches in a record or static in a received radio signal, for example. However, such prior art scratch filters are a fixed resistor and a fixed capacitor connected across the audio channel merely to act as a high frequency filter to shunt away from the system output such noise signals. These filters are generally designed to remove scratch noise at 4 kc. and above. Of course, the design of such a prior art scratch filter prohibits it from rolling off or attenuating noise signals below 4000° cycles per second. Even though a scratch filter could be designed to remove signals at lower frequencies, such a filter would also remove desired signals from the reproduced sound, thereby resulting in a general degradation of the sound even when the scratch noise could be eliminated by a higher frequency filter.

Such a sound system usually also includes a treble control which may be considered broadly as a variable high frequency filter but is used to balance the loudness of the reproduced sound in accordance with the Fletcher-Munson curves. Such a treble control comprises a potentiometer resistor and a capacitor connected in series across the audio channel. The wiper arm of the potentiometer is connected to an output terminal. When the treble control is positioned such that the wiper arm does not contain any of the resistor in series therewith, the control is at its maximum treble position and the audio signal appearing at the output terminal contains the maximum amount of high audio frequency power. However, as the treble control is adjusted so that the wiper arm includes more of the potentiometer resistor in series with the output terminal, more and more high frequency currents are shunted through the series capacitor of the treble control to ground and the attenuation of high frequency power at the output terminal is increased.

In other words, the conventional treble control and scratch filter operate independently of each other in such a manner that neither is effective in providing a variable scratch filter for rolling off or attenuating scratch noise below 4000 cycles per second, i.e., scratch noise in the middle audio frequency range which contains the primary frequencies heard as sound by the human ear.

Therefore, it is a primary object of this invention to provide a coordinated treble control and scratch filter circuit which will permit a variable attenuation of scratch noise in the mid-audio frequency range.

A more specific object of this invention is to include as part of the resistance in a resistor-capacitor scratch filter circuit the variable resistance of the potentiometer in a treble control, such that as the treble control is operated to roll off or attenuate a greater amount of high frequencies, the filtering characteristic of the scratch filter is changed so that it will roll off or attenuate lower frequencies, i.e., the roll-off corner decreases in frequency as the treble control is operated to its minimum position ffectively to increase the rate at which the scratch noise is attenuated.

In accomplishing the foregoing objects, there is provided in a preferred embodiment a scratch filter connected in series with the wiper arm of the potentiometer of a treble control. The scratch filter comprises a resistor connected at one end to the potentiometer wiper arm and in series therewith. A capacitor is connected between the other end of the resistor and ground. Consequently, as the treble control potentiometer is operated to increase the attention or roll-off of high frequencies to balance the loudness of the reproduced sound, the resistance in the RC scratch filter circuit is increased, thereby lowering the frequency of the so-called roll-off corner of the scratch filter. In other words, the scratch filter is automatically varied so that its cut-off point or roll-off corner is lowered in frequency, thereby eliminating from the system output terminals scratch noises at a lower frequency than is possible without such unique arrangements of treble control and scratch filter. The scratch noise attenuation of the filter alone is 6db per octave for frequencies above the roll-off corner, but when combined with the treble control, increases to a maximum of 12 db per octave when the treble control is at its minimum setting for maximum attenuation of treble tones. That is, high frequency roll-off or attenuation of the treble control and scratch filter are additive, and the variable feature of the scratch filter permits roll-off of scratch noise which may contain frequencies as low as 1 kc.

Other objects and advantages will become apparent from the following description of the preferred embodiment of the invention which is also illustrated as a schematic circuit diagram on the attached drawing.

As shown in the drawing, there is provided a high potential input terminal 10 and a low potential or grounded input terminal 12. These terminal may receive an audio frequency signal from the bass control of a sound reproduction system. Connected to input terminals 10 and 12 is a treble control 14 comprising a fifty-kilohm linear potentiometer resistor 16 connected in series with a 3300 micromicrofarad capacitor 18. The resistor and capacitor are connected across input terminals 10 and 12. Capacitor 18 is chosen to present a very low impedance to high audio frequencies and consequently a high impedance to bass frequencies. A wiper arm 20 is slidable along resistor 16.

A scratch filter 22 is connected between treble control 14 and a pair of output terminals 24 and 26. Terminal 24 is at high potential and terminal 26 is grounded. Scratch filter 22 includes a ten-kilohm resistor 28 and a 3300 micromicrofarad capacitor 30. Resistor 28 is connected in series with wiper arm 20 and terminal 24. Capacitor 30 is connected across the output terminals 24 and 26 through a single-pole, single-throw switch 32. The output terminals may be connected to other controls which are part of an amplifier and speaker system.

When wiper arm 20 is at the top of resistor 16, the treble control is at its maximum setting, that is, there is no attenuation of the audio frequencies appearing in the signal applied to input terminal 10. However, if switch 32 is closed to place capacitor 30 across treble control 14, then a 6-db per octave attenuation of the high frequencies is obtained above the roll-off corner or cut-off frequency of filter 22.

However, when the treble control 14 is operated to move wiper arm 20 toward capacitor 18 to roll off or attenuate the high frequencies for balancing the loudness of the reproduced sound, then the net roll-off or attenuation is increased until it reaches 12 db per octave when the wiper arm is positioned at the end of resistor 16 adjacent to capacitor 18.

Furthermore, as the wiper arm 20 moves down resistor 16, the portion of resistor 16 above the wiper arm is added in series to resistor 28 of scratch filter circuit 22. The scratch filter utilizes this added series resistance from the treble control to decrease the roll-off corner or cut-off frequency of scratch filter 22. The roll-off corner is defined as the frequency at which the reactance of capacitor 30 equals the total resistance of resistor 28 and the portion of resistor 16 above wiper arm 20. When the wiper arm 20 is at the bottom of resistor 16, the total rate of roll-off or attenuation of scratch noise above the roll-off corner of scratch filter 22 is 12 db per octave. Of course, switch 32 may be opened to disconnect the scratch filter 22.

In summary, this variable scratch filter circuit permits an increase in roll-off or attenuation of scratch noise occurring in the mid-audio frequency range. The filter's roll-off corner is made variable by placing the variable resistance of the treble control in series with the fixed resistor of the fiter.

While this invention has been particularly shown and described with reference to a preferred embodiment thereof, it will be understood by those skilled in the art that various changes in form and detail may be made therein without departing from the spirit and scope of the invention.

What is claimed is:

1. Audio signal tone control circuit comprising
(a) an input terminal
(b) a common terminal
(c) a treble control circuit comprising
  (1) a resistor and a capacitor connected in series between said terminals,
  (2) said capacitor having low reactance relative to the impedance of said resistor at high audio frequencies
(d) an output terminal
(e) a unitary wiper arm having one end thereof movable along said resistor and the other end fixedly connected to said output terminal,
(f) a scratch filter circuit connected between said other end of said wiper arm and said common terminal comprising
  (1) a capactor having a relatively low reactance to treble frequencies and a relatively high reactance to base frequencies, thereby to shunt scratch noise frequencies from said output terminal.

2. A scratch filter circuit having an input terminal, a common terminal and an output terminal comprising the combination of
(a) a treble control network comprising
  (1) a unitary potentiometer resistor and a capacitor connected in series between said input terminal and said common terminal, and
  (2) a unitary movable tap between said resistor and said output terminal, and
(b) a scratch filter comprising
  (1) a second capacitor connected between said movable tap and said common terminal, said second capacitor having a relatively low reactance to treble frequencies, together with the relatively high reactance to base frequencies, thereby to shunt scratch noise frequencies from said output terminal.

3. A scratch filter circuit as defined in claim 2 further comprising a second resistor connected between said movable tap and said second capacitor.

4. A scratch control circuit as defined in claim 3 further comprising a switch in said scratch filter network for disabling said scratch filter.

5. A loudness control circuit comprising
(a) an input terminal,
(b) an output terminal,
(c) a common terminal,
(d) a first resistor and a first capacitor connected in series between said input and common terminals, the reactance of said capacitor being relatively low at treble frequencies and relatively high at bass frequencies,
(e) a movable tap on said resistor,
(f) a second resistor connected between said movable tap and said output terminal, and
(g) a second capacitor and a switch connected in series between said output terminal and said common terminal, said second capacitor having a relatively low reactance to treble frequencies and a relative high reactance to bass frequencies, whereby the roll-off corner frequency of the scratch filter formed by said second resistor and capacitor decreases as said movable tap moves from said input terminal toward said first capacitor.

References Cited

UNITED STATES PATENTS

| | | |
|---|---|---|
| 2,377,121 | 5/1945 | Bachman. |
| 2,900,609 | 8/1959 | Estkowski. |
| 3,332,041 | 7/1967 | Wilson et al. |
| 2,680,232 | 6/1954 | Claras. |
| 2,121,091 | 6/1938 | Maginnis. |
| 1,938,256 | 12/1933 | Jacobs. |
| 2,812,498 | 11/1957 | Hall. |
| 2,121,150 | 6/1938 | Jarvis. |

HERMAN KARL SAALBACH, *Primary Examiner.*

C. BARAFF, *Assistant Examiner.*

U.S. Cl. X.R.

179—1